Sept. 2, 1969    T. A. HENDRICKSON ET AL    3,464,265
CARD VERIFIER
Filed June 21, 1965    5 Sheets-Sheet 1

INVENTORS
THOMAS A. HENDRICKSON
DONALD C. CROLL

BY *Douglas R. McKechnie*

ATTORNEY

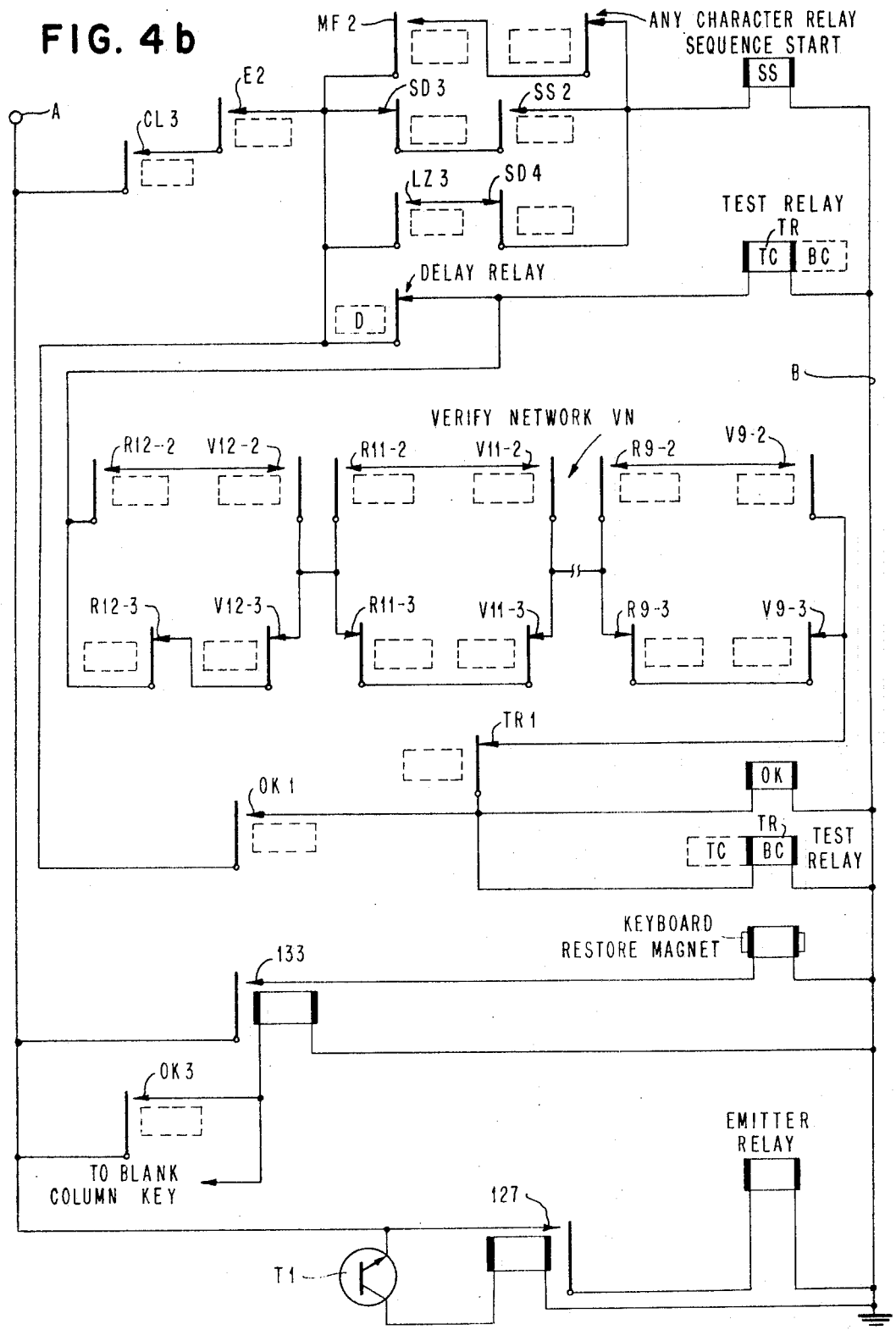

United States Patent Office 3,464,265
Patented Sept. 2, 1969

3,464,265
CARD VERIFIER
Thomas A. Hendrickson, Poughkeepsie, and Donald C. Croll, Pleasant Valley, N.Y., assignors to International Business Machines Corporation, Armonk, N.Y., a corporation of New York
Filed June 21, 1965, Ser. No. 465,528
Int. Cl. G01b 5/16; G06k 5/00
U.S. Cl. 73—156                                  8 Claims

ABSTRACT OF THE DISCLOSURE

A card verifier that is capable of automatic verification of left zeros and verification of blank columns under either program or keyboard control. Included is a register, a first circuit that causes the register to represent a zero column, and a second circuit that causes the register to represent a blank column. When in either verification mode, a left zero or blank column field is verified until the significant digit is reached, stopping the card in the column that the significant digit is punched. The remaining columns of that field may then be key verified. During left zero or blank column verification, the manual verification apparatus is rendered inoperative as is the error indication apparatus. Manual verification is only permitted when a significant digit in the field is sensed.

---

This invention relates to improvements in card verifiers.

As is known, a card verifier is a record card machine used to check the accuracy of a record card having data recorded therein such as by punched holes located according to a code in specific areas of the card. In the operation of a card verifier, it is desirable to minimize the amount of time required to verify a complete record card to thereby increase the rate of card verification. Prior art efforts to increase the rate of card verification, that is increase the machine output, have been directed to automatic verification of data that is common to successive cards at rates faster than the rates at which an operator can key the common data. Prior art efforts have also been directed to reducing the number of key strokes required of an operator to initiate automatic operations such as the above automatic verification or skipping, etc., to key repetitive data of such as left zeros, i.e., zeros to the left of the first signfiicant digit, or to verify blank columns, i.e., columns to the left of the first significant digit without any punch information. However, the results have not been altogether satisfactory for many reasons such as the fact that the rate of automatic verification is relatively slow, or that the verifier requires a complex mechanism to carry out the desired operations, or that the functions cannot be initiated both under keyboard control and by programming.

Accordingly, it is a principal object of the invention to provide a card verifier having a relatively high output rate brought about by increasing the speed of automatic verification and decreasing the number of operator strokes for keying repetitive data or initiating certain operations.

Another object is to provide a card verifier having novel means for verifying left zeros and blank columns.

Still another object is to provide a verifier capable of verifying blank columns under both program control and under keyboard control where the operation is completely independent of the program control.

The foregoing and other objects, features and advantages of the invention will be apparent from the following more particular description of a preferred embodiment of the invention, as illustrated in the accompanying drawings.

In the drawings:

FIGS. 4a–4c is a wiring diagram showing those elements pertinent to an understanding of the invention.

Figure 1:
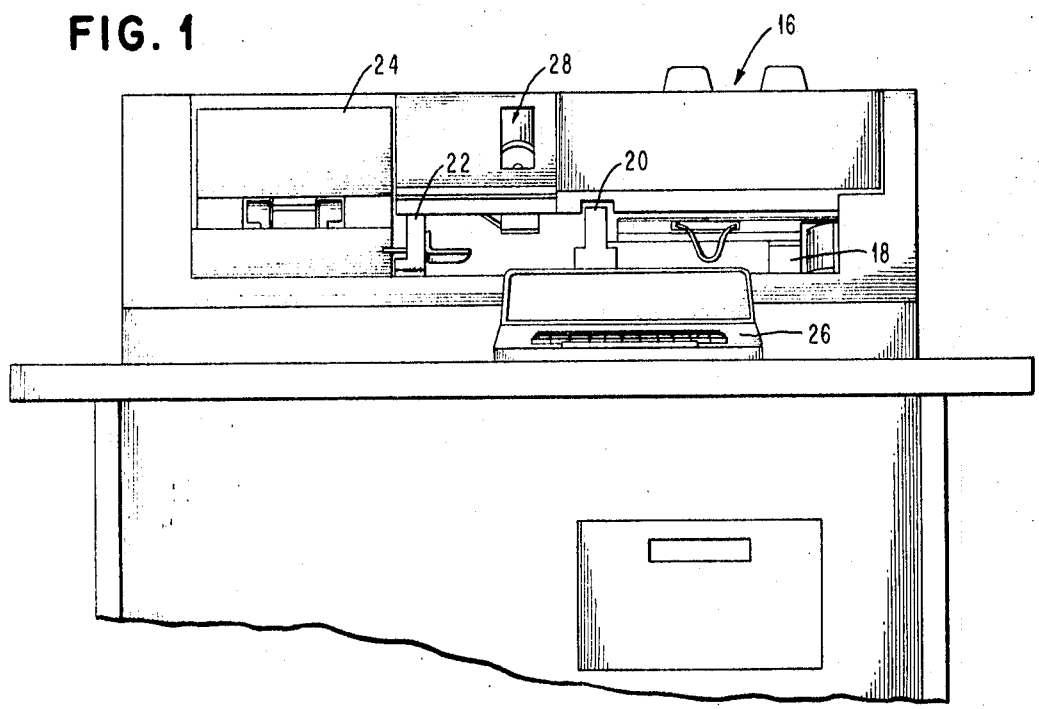
FIG. 1 is a front elevation view, with portions removed, of a verifier embodying the invention.

Referring now to the drawings, the invention is illustrated as embodied in a verifier 14, having a cover design similar to that shown in U.S. Design Patent 197,-334 now abandoned—Bixler et al. The purpose of verifier 14 is to verify or check the accuracy of holes punched in a common or conventional record card divided into eighty columns each containing twelve rows numbered from the top row to the bottom row in the following sequence 12, 11, 0, 1, 2, 3, 4, 5, 6, 7, 8 and 9, a particular hole being known by the row in which it is located, such as a 12 hole, 3 hole, etc. Verifier 14 comprises a card handling mechanism, a notching mechanism, a program drum and a star wheel sensing device similar to those of the well-known "IBM 56 Card Verifier," these elements being described in numerous publications such as U.S. Patent 2,615,333—Gardinor et al.—and the copyrighted publication, "IBM Customer Engineering Manual of Instruction for 56 Card Verifier," to which reference may be had for a more detailed description. In this regard, in the illustrated verifier 14, punch cards are verified manually or automatically. During manual verification, the operator presses the keys in the same manner as for the original punching. In automatic verification, after the first card has been key-verified, the same field in the second card is compared automatically with the first card, the third card with the second, etc. Automatic left zero verification is a programmed automatic verification of the zeros preceding the first significant digit of a field. When a field so programmed is reached, the verifier 14 will, in a manner to be explained below, automatically verify the zeros punched in each column, and if a significant digit or blank column is reached, the card stops. In blank column verification, as will be explained in greater detail below, all columns are verified to be blank until the first significant digit is reached. In each case, i.e., left zero or blank column verification, after the card stops, verification of the remainder of the field (or the following field) resumes. Otherwise, the movement and the sequence of the cards through the verifier is the same as in conventional manual or automatic verification.

General Mechanical Features

The card handling mechanism of verifier 14 comprises a card hopper 16 in which the cards to be verified are stored and from which the cards are fed one at a time along a transport bed 18 through a verify station 20 and a read station 22 to a card stacker 24. The verifier operation is controlled by a keyboard 26 and a program drum 28. While passing the verify station, a card is known as a detail card, and while passing through the read station, a card is known as a master card from which information can be read and compared with that of the detail card. Located at verify station 20 are a conventional notching mechanism and optical sensing means, described more fully below, which senses the presence and location of any holes in the aligned column of a detail card. Keyboard 26 is a conventional and contains various switches for controlling operation of the verifier and various keys for controlling functions and keying information or original data to manually verify the detail card. Keyboard 26 "locks up" when a key is depressed and must be restored by operation of a conventional keyboard restore magnet in order to allow an operator to proceed.

Figure 2:
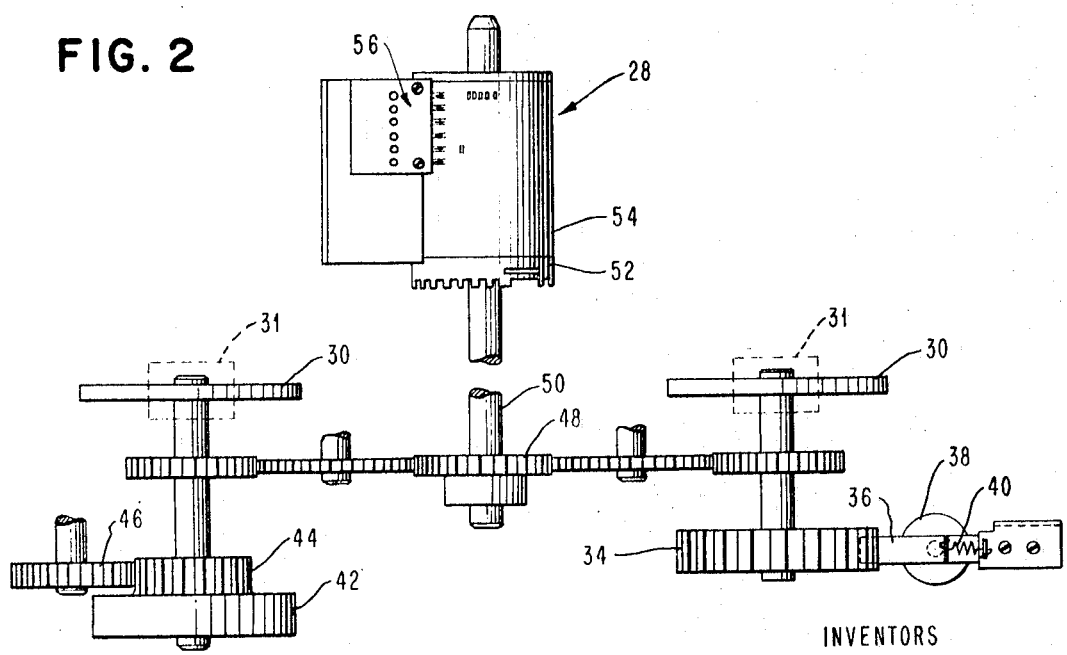
FIG. 2 is a schematic plan view of the escapement mechanism of the verifier.

With reference to FIG. 2, the master and detail cards are moved through the stations by means of the escapement mechanism shown in this figure. The mechanism is old except that it has been modified to include, as one of the elements driven in synchronism with movement of the cards through the stations, an emitter wheel 52, more fully described below. Briefly, the escapement mechanism includes a pair of friction feed rolls 30 which cooperate with pressure rolls 31 to move cards along the bed in response to rotation of the feed rolls. This rotation is controlled by an escape wheel 34 having a plurality of ratchet teeth that are normally engaged by an escapement armature 36, of an escape magnet 38, to prevent rotation of the feed rolls. Feed roll 30 and escape wheel 34 are connected through a gear train to the output shaft of a friction clutch 42. A continuously rotating driving gear 46 engages the input gear 44 of friction clutch 42 to frictionally bias the escapement mechanism in conventional fashion in a direction tending to advance the cards. By momentarily actuating escape magnet 38, armature 36 disengages the escape wheel to allow it to escape and a return spring 40 moves the armature back into engagement with the next tooth of the escape wheel to limit escapement and advancement of the card to one column. In other words, by intermittently operating escape magnet 38, a card is advanced column by column through the read and verify stations.

The escapement mechanism further includes a gear 48 that drives a program drum shaft upon which program drum 28 is detachably mounted. Emitter wheel 52 is also mounted on shaft 50 for rotation in synchronism with movement of the cards. Program drum 28 detachably supports a program card 54 having a plurality of control holes herein for controlling automatic operations of the verifier. While it will be apparent that the particular holes used to initiate or hold functions is purely a matter of choice, the invention will be described wherein the 12–3 rows define a program and a 2 hole is used to initiate left zero verification, a 1 hole is used to initiate blank column verification and 12 holes are used to define a field and continue the particular function that has been initiated for as long as a row contains successive 12 holes. Mounted adjacent to program drum 28 is a star wheel sensing device 56 of modified conventional construction. Device 56 includes one star wheel STW for each row of control holes in program card 54, the operation of device 56 being controlled by a switch (not illustrated) that moves the star wheel into and out of engagement with the program card and establishes the necessary electrical connections for program control. This device, similar to that disclosed in U.S. Patent 2,517,984—Cunningham, works on the principle that each star wheel rides along the surface of the program card until a hole is encountered whereupon the star wheel pivots into the hole and closes the star wheel contacts (FIG. 4c) associated therewith. The 12 star wheel is advanced ahead of the functional star wheels so as to overlap therewith and hold whatever function is initiated thereby.

General optical system

Figure 3:
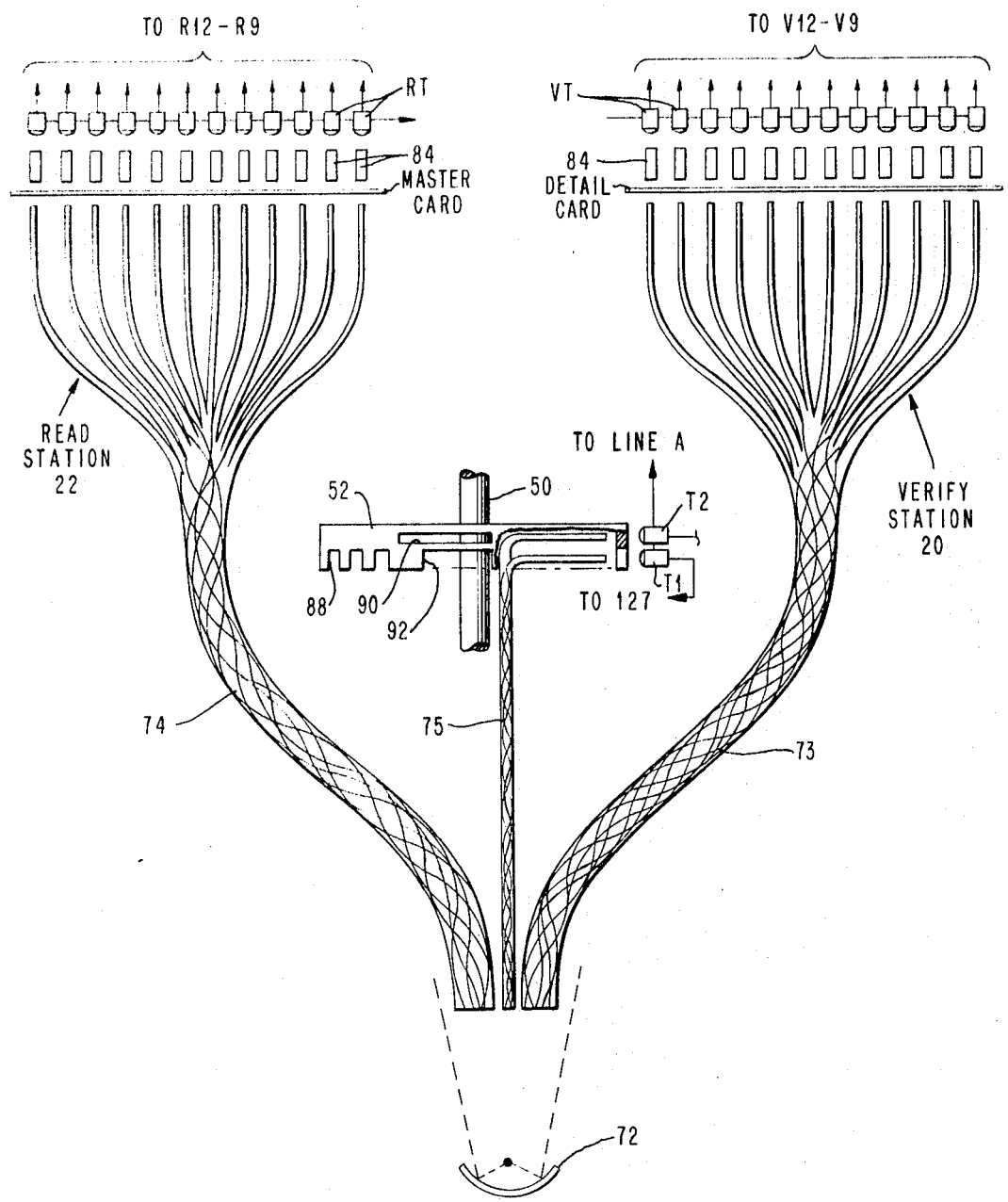
FIG. 3 is a schematic view of the optical system of the verifier.

Verifier 14 also includes an optical timing and sensing system described and claimed in the co-pending application of T. A. Hendrikson and W. L. Stahl, assigned to the assignee of the present application and filed concurrently herewith. The optical system comprises a projection lamp 72 that projects a high intensity light beam onto the input ends of three fiber optic bundles 73, 74 and 75, which conduct the light received thereby to the verify and read stations 20 and 22 and to emitter wheel 52, respectively. As shown in FIG. 3, the output end of each bundle 73 and 74 is divided into twelve portions oriented to direct the light emerging therefrom upwardly into light pipes 84. These light pipes in turn direct the light conducted thereby onto phototransistors VT12–VT9 and RT12–RT9. At each station, the ends of the fiber optic bundles, light pipes 84 and the associated phototransistors generally lie in a plane that extends across the path of movement of the punched cards in alignment with the card rows to provide means for sensing the presence and location of the punched holes in each card on a column-by-column basis. The verify and read phototransistors are intermittently biased from collector to emitter in synchronism with registration of the columns of the card within their sensing plane so that the light passing through a punched hole is directed on the base of the phototransistor to activate it and render it conductive.

The output end of bundle 75 is divided into two portions which direct emerging light outwardly toward the inner wall of emitter wheel 52 and toward phototransistors T1 and T2. Emitter wheel 52 is opaque and has a plurality of short slots 88 and a long slot 92 for controlling the light received by T1 and a long slot for controlling the light received by T2 from bundle 75. Slots 88 correspond in number to the number of columns in a card and are aligned therewith so as to produce or emit timing or control pulses in synchronism with movement of the cards. Slots 90 and 92 are used to control between card functions similar to the manner of the well-known program cams and contacts of the aforementioned "IBM 56 Card Verifier," but since such functions form no part of the present invention, they need not be described any further.

Figure 4A:
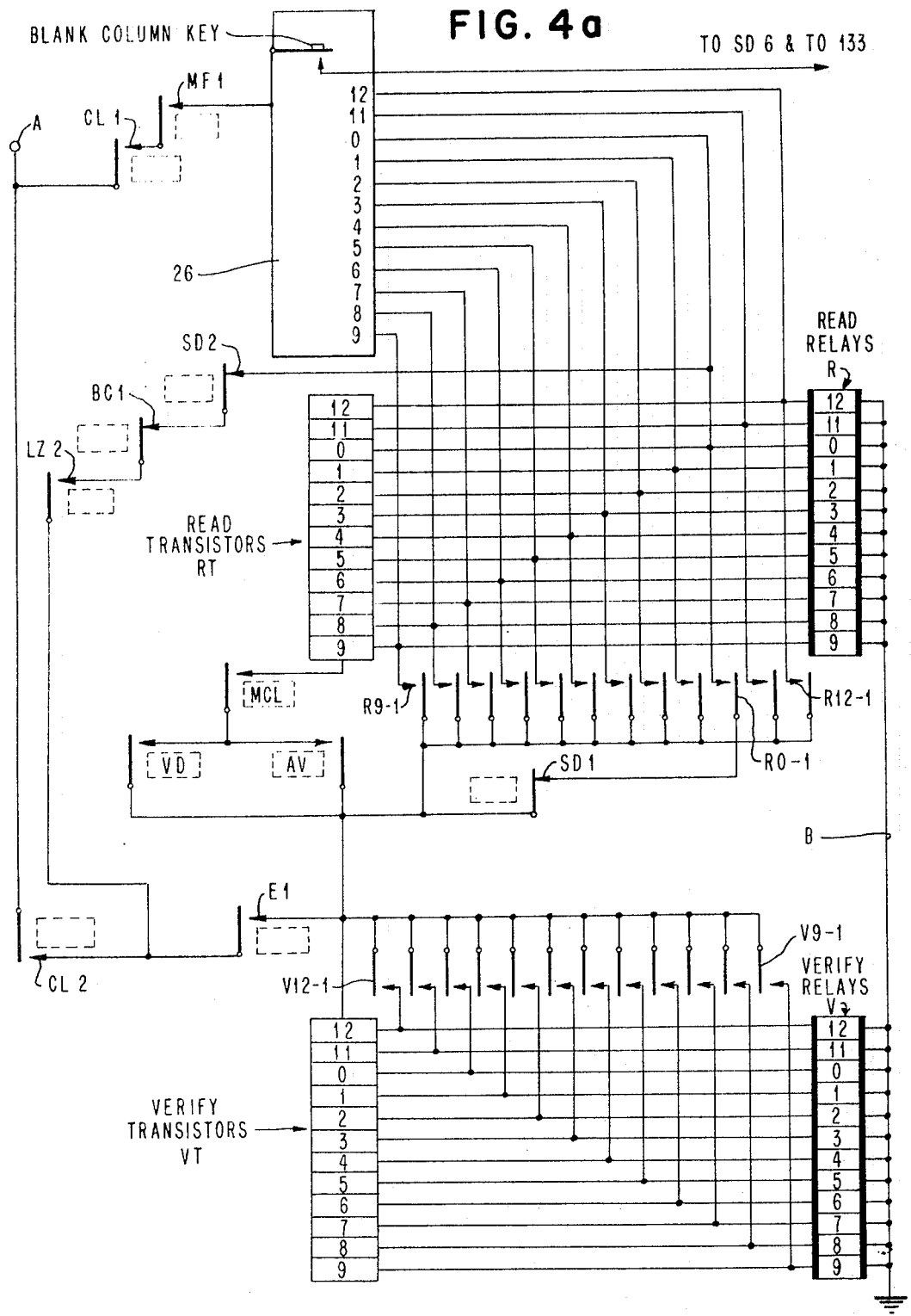
Figure 4C:
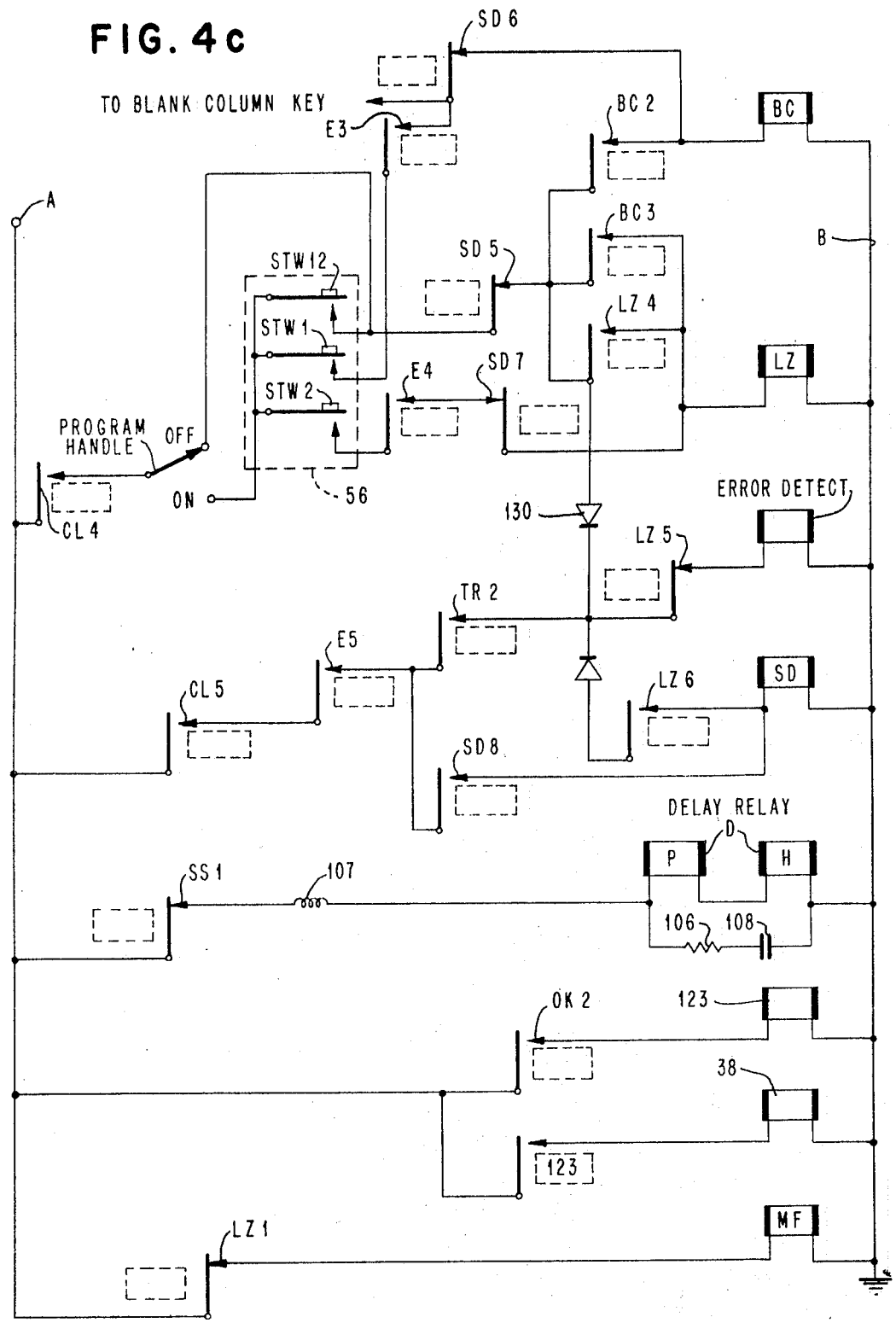

Wiring diagram—FIGS. 4a–4c

The wiring diagram is a simplified illustration showing schematically those elements essential to an understanding of the invention as explained with reference to the verifying under three modes, manual verification, blank column verification and left zero verification. This diagram does not purport to show all of the elements that would be included in this type of a verifier, and it will be understood that many functions, interlocks, relays, diodes, components, etc., which are well-known and in practice would be involved in the operation of such a machine, are omitted from the present specification for simplicity of illustration and ease of understanding.

Verifier 14 includes a conventional control switch and power supply (not shown) which supplies electric power to a negative power line A and a ground line B that extend along the left and right hand edges of the wiring diagram so as to contain the various operating circuits between the lines. In the diagram, the switches and contacts are shown in their normal unactuated condition. Verifier 14 preferably employs reed relays because of their last operating times, low power requirements and quietness of operation. In the diagram, in a relay having only a single set of points or contacts, both the relay and contacts are designated by the same reference character whereas, with relays having more than one set of contacts, the operating coil is indicated by a reference character and the sets of contacts are differentiated by numerical suffixes appended thereto. It should also be appreciated that while the diagram shows single relays or magnets, more than one relay or magnet may be used in actual practice especially in those cases where the contacts or elements operated thereby are relatively numerous.

Verifier 14 includes a conventional detal card lever (not shown) actuated by a detail card for energizing a card lever relay CL to condition various circuits that depend, for their operation, upon the presence of a detail card. Relay CL has normally open contacts CL1–CL7 which will be assumed closed, unless otherwise indicated, throughout the following description, since the invention will be explained with reference to what is done while a detail card is at the verify station 20.

Referring now to FIG. 4a, it will be seen that verifier 14 includes two registers, one comprising a bank of read relays R12–R9 and the other comprising a bank of verify relays V12–V9. In general, data is entered into the respective registers from different sources and it is then verified so that if a comparison exists, the card is advanced and if the data lacks a comparison, the lack indicates that an error exists during manual verification or that a significant digit has been reached during blank column or left zero verification. Verify relays V are connected in series with the collectors of the verify transistors VT which have their emitters connected in common to line A through contacts CL2 and E1. A plurality of hold contacts V12–1 through V9–1 are connected in parallel with transistors VT, each hold contact being closed upon picking of the associated relay. The emitter contacts E1 are operated or closed in synchronism with movement of the cards through the verify station, the contacts being closed when a column of the card is registered for sensing whereby a voltage is applied across the emitter and collector of each transistor so that any light passing through a hole aligned with the respective transistor will render it conductive to thereby generate sufficient current to pick the associated relay. When the relay picks, it closes its hold contacts to thereby short circuit the associated transistor and render the holding of the verify relays dependent on emitter contacts E1. When contacts E1 subsequently open, the verify relays are dropped.

Similarly, read relays R are connected in series with the collectors of read transistors RT having commoned emitters connected through the contacts of a master card lever relay MCL and through the parallel combination of the contacts of a VER–DUP relay VD or automatic verify relay AV to contacts E1. However, since the operation of the read transistors RT and relays MCL, VD and AV are not pertinent to blank column or left zero verification, further description thereof is unnecessary. Read relays R have associated therewith a plurality of hold contacts R9–1 through R12–1 arranged similarly to the verify relay hold contacts with the exception of that contact associated with the zero relay R0 which has its hold contact R0–1 connected in series with the normally closed significant digit relay contact SD1. During manual verification, data is entered into the read relay register by means of keyboard 26. Keyboard 26 is connected to line A through contacts CL–1 and MF–1, the latter contacts being those of a manual field relay MF (FIG. 4c). Relay MF is connected in series with the normally closed contacts LZ1 of a left zero relay and provides an interlock to prevent operation of the keyboard 26 during blank column or left zero verification, from picking the read relays. During manual verification, when a key of the keyboard 26 is depressed, an output is fed to the one or ones of relays R which corresponds to the particular code of the key board and the respective read relays are thereby picked. Upon being picked, they are held through their hold contacts R9–1 through R12–1 described above.

With reference to the verify relay register, it will be seen that a left zero is represented therein by the picking of the relay V0 and a blank column is represented therein by the fact that none of the relays are picked. Similarly, in the read relay registers the picking of relay R0 or the lack of picking of any relays corresponds to a left zero or blank column. However, since during blank column or left zero verification, neither the read transistors RT nor keyboard 26 can be used, a special circuit is provided for picking read relay R0, this circuit comprising the series of contacts extending from contact CL2 and comprising contacts LZ2, BC1, and SD2. Contact LZ2 is closed during left zero verification and picks relay R0 until a significant digit is reached whereupon SD2 and SD1 open to drop relay R0. Contact BC1 is operated during blank column verification to prevent relay R0 from being picked, since during blank column verification contact LZ2 is also closed.

As shown in FIG. 4b, each one of the read and verify relays has a set of normally open and normally closed contacts designed R12–2 and R12–3, V12–2 and V12–3, etc. The contacts are arranged in a series parallel fashion to form a verify network VN whose function is to energize the bucking coil BC of a test relay TR and to pick on OK relay when the data being verified compare or to prevent energization thereof when the data lack a comparison. Verify network VN comprises twelve contact groups connected in series, the groups corresponding to card rows 12–9. In each group, the normally open contacts of the read and verify relays are connected in series with each other and in parallel with the series connection of the normally closed contacts. For example, R12–2 and V12–2 are connected in series with each other and in parallel with the series connection of R12–3 and V12–3, and this group is connected in series with the remaining groups. Therefore, in order for current to flow through the verify network, relays V and R which control each group has to be in the same condition, picked or dropped. Test relay TR includes a test coil TC wound opposite to a bucking coil BC so that when both coils are energized, their effects cancel each other to prevent picking of the test relay, but, when only the test coil TC is energized, test relay TR will pick. The test coil TC is in paralel with the series combination of the verify network and contact TR1 and of the parallel arrangement of coil BC and the OK relay, and all are in series with the contacts of a delay relay D which controls operation of the verify network which forms the comparing means for comparing the aforementioned registers. OK relay has contacts OK1 connected in paralel with the network VN.

Operation of the delay relay is controlled by a sequence start relay SS which, as shown in FIG. 4c, has its contacts connected in series with the pick and hold coils of the delay relay. An inductor 107 is connected in series with relay D and a resistor 106 and a capacitor 108 are connected in parallel therewith to provide a time delay after relay SS drops which is of sufficient duration to insure that the contacts of the verify network are closed free from contact bounce at the moment the delay relay closes to apply a test pulse to the verify network. As shown in FIG. 4b, the contacts of the delay relay are connected to the power line through emitter contacts E2 and contacts CL3. The sequence start relay operates under those conditions during which it is desired to verify data and it is the sequence start relay which generally initiates the sequential action of causing the verifier to first verify and then escape if the data verified are correct. During manual verification, relay SS is picked by the circuit including contacts MF2 and those of the ANY CHARACTER RELAY. It will be recalled that contacts MF2 are closed during manual verification. The ANY CHARACTER RELAY is adapted to be energized so long as none of the read relays are picked. Thus, during manual verification, until a key is depressed the ANY CHARACTER RELAY is energized and the sequence start relay SS is de-energized. Upon depressing a key, which picks a read relay, the ANY CHARACTER RELAY is dropped and this causes the sequence start relay to pick. It is then held through contacts SS2 and SD3. During left zero and blank column verification the sequence start relay SS is picked through contatcs SD4 and LZ3 which, since these contacts are closed until a significant digit is reached, transfers control of the picking and dropping of relay SS to emitter contacts E2.

With reference to FIG. 3 and to the bottom of FIG. 4b, it will be seen that the phototransistor T1 is operated as a switch between conducting and non-conducting states in response to the intermittent irradiation thereof by the light that intermittently passes through emitter wheel 52, as the emitter wheel rotates, to control actuation of an emitter sense relay 127 which in turn controls operation of the emitter relay E so that when the light passes through one of the slots 88, transistor T1 conducts and picks relay 127 to cause the picking of emitter relay E. The slots 88 are aligned so that the emitter relay E is picked when the card is located at the verify station so that light from the fiber optic bundle associated therewith passes through any punched holes contained in the column. The emitter relay then is intermittently picked and dropped in synchronism with movement of cards through the verifier to generate the timing and control pulses that are generally used to control operation of the sequence start relay SS and of the read and verify relays. OK relay contacts OK2 (FIG. 4c) are connected in series with a relay 123 so that upon closing of contacts OK2 due to picking of the OK relay, relay 123 picks and energizes escape magnet 38 causing the escapement armature to be disengaged from the escape wheel. It will be recalled that the OK relay is held through emitter contacts E2 so that as the escapement mechanism escapes and the emitter wheel 52 rotates, emitter relay E is dropped to open contacts E2 and there upon drop the OK relay and de-energize escape magnet 38 so that the armature returns to engagement with the next tooth and thereby limits advance of the card to one column.

The OK relay, through contacts OK3 (FIG. 4b) is also used to restore the keyboard, these contacts being connected in series with a relay 133 that controls the keyboard restore magnet.

Test relay contacts TR2 (FIG. 4c) translate the picking of test relay into a control function. During manual verification, when contacts TR2 close, an error detect relay is picked to indicate that an error has been detected and to thereby require a conventional error routine prior to proceeding with advancing the detail card. During left zero and blank column verification, contacts TR2 also control the picking of a significant digit relay SD and establish a special hold circuit through diode 130 to prevent a relay race due to any discrepancy in differences in the time of operation between relays SD and LZ.

Blank column verification

In the illustrated verifier, blank column verification is initiated either by depressing a BLANK COLUMN KEY of keyboard 26 or automatically under program control wherein, for example, a 1 hole is used to initiate the operation in the first column of a field and successive 12 holes are used to define the field. A PROGRAM HANDLE switch is movable between an OFF and ON position for controlling operation of the program. When the BLANK COLUMN KEY is depressed to initiate a blank column verification, the operation can proceed without program control, wherein PROGRAM HANDLE is OFF, in which case the verifier will verify blank columns until a significant digit is reached whereupon the verifier automatically reverts to manual verification for verifying the significant digit, or with the PROGRAM HANDLE ON the blank column verification can continue until either a significant digit is reached or the end of a field defined by the twelve holes in the program card, is reached.

When the BLANK COLUMN KEY is depressed, the blank column relay BC is picked through contacts SD6 and this action closes hold contacts BC2 to establish a hold circuit for relay BC which extends to contacts SD5 and either contacts STW12 or the PROGRAM HANDLE switch if in the OFF position, dependent on the setting of the program handle. When relay BC picks, contacts BC1 (FIG.4a) open to prevent subsequent energization of the relay LZ from picking read relay R0. The picking of relay BC also closes contacts BC3 to pick the left zero relay LZ.

When the left zero relay LZ picks, contacts LZ1 open to drop the manual field relay MF and thereby open contacts MF1 to prevent operation of keyboard 26; contacts LZ2 (FIG. 4a) close but, since contacts BC1 are open, nothing happens as a result; contacts LZ3 (FIG. 4b) close to pick the sequence start relay SS; contacts LZ4 (FIG. 4c) close to establish a primary hold circuit that extends along the same path as that for relay BC; contacts LZ5 (FIG. 4c) open to prevent operation or picking of the error detect relay should the test relay pick as a result of a lack of comparison between the registers; and contacts LZ6 close to condition a circuit for picking relay SD in response to closing of contacts TR2. The picking of the sequence start relay initiates the above described sequence of events. Thus, when the delay relay drops, the OK relay picks the registers compare and advances the card to the next column or the test relay picks when the registers do not compare. Should the first column contain a significant digit, one of the verify relays would be picked so that when the delay relay drops, the test relay picks and contacts TR2 close to pick the significant digit relay SD through contacts LZ6. When relay SD picks, its hold contacts SD8 close and establish a hold circuit through emitter contact E5 and CL5 so that when the card subsequently is advanced, the dropping of the emitter relay opens contact E5 to drop relay SD. The picking of relay SD opens contact SD5 and relays BC and LZ are then held through diode 130 and the closed test relay contacts TR2. The dropping of relay SD also opens contacts SD3 and SD4 to drop the sequence start relay and thereby pick the delay relay D. When this happens, the test relay TR drops causing contacts TR2 to open whereupon relays LZ and BC drop causing the verifier to require a manual verification to verify the significant digit that interrupted the blank column verification. Thereafter, when the keyboard is operated and the significant digit is verified so that the detail card is advanced, the emitter relay drops and contacts E5 open to drop the significant digit relay SD. The dropping of these relays then restores the verifier to its normal operation so that should the significant digit not be correct, the error detect relay will pick due to the fact that contact LZ5 is closed to condition it for operation.

When blank column verification is fully controlled by the program drum, the PROGRAM HANDLE switch is ON and the blank column relay BC is picked through contacts STW1, E3 and SD6 to initiate the operation. As the program card moves into the first column of a field, the functional contacts, that is STW1 close slightly before the emitter relay picks so that relay BC is picked upon closing of contacts D3. The 12 star wheel contacts STW12 are arranged to close before the functional star wheel contacts open upon escapement to the next column and the contacts STW12 remain closed in customary manner until the end of a field is reached whereupon as the program card advances from the last column of the field, contacts STW12 open to thereupon drop relays BC and LZ. Thus, it will be appreciated that during blank column verification, the detail card moves under program control until the end of a field is reached, or without program control, until a punched column is reached. An error condition is not indicated when the machine stops, and keyboard verification can be continued.

Left zero verification

In the illustrated verifier, left zero verification is accomplished fully by program control which requires that the PROGRAM HANDLE be ON. A 2 hole in the program card is used to initiate the operation and 12 holes are used to define the left zero field. When contacts STW2 and E4 close, the left zero relay LZ is picked. The operation then proceeds in the same manner as during blank column verification except that the picking of the LZ relay closes contacts LZ2 which, since at this time the BC relay is dropped, picks read relay R0 to cause the read relay register to represent a zero. This then requires that a zero be sensed at the verifier station in order to generate a comparison that causes the cards to be advanced until either a significant digit or the end of the field is reached. Upon reaching a significant digit, the operation is similar to that before or described above and the machine reverts to requiring manual verification to verify the significant digits. To accomplish this, it is necessary that the read relay R0 be restored to its normal condition and this happens because when the relay SD picks, contacts SD1 and SD2 open. It should be noted that the term "significant digit" has a slightly different meaning when used with reference to either blank column veification or left zero verification. During blank column it means something other than a blank column and during left zero it means a digit other than zero or a blank column.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a card verifier having means to feed a card column-by-column and sensing means for sensing the data in each column, the combination of:
    register means adapted to have data entered therein;
    means for comparing the data sensed by said sensing means with that is said register and actuating said feed means to advance the card one column each time the data compare;
    first circuit means for causing said register to be set to a condition corresponding to a zero column;
    second circuit means for causing the register means to be set to a condition corresponding to a blank column;
    and means jointly controlled by said first and second circuit means for operating said comparing means to verify left zeros and blank columns, according to which circuit means is operated, until a column is reached containing data other than a left zero or a blank column.

2. In a card verifier, the combination of:
    intermittently actuated escapement means adapted to advance a card one column in response to each actuation thereof;
    a first register intermittently operated in synchronism with movement of said card to represent data in a column of said card during each period of operation;
    a second register continuously operated to represent either a zero or a blank column;
    first means selectively operable to operate said second register to represent a zero;
    second means selectively operable to operate said second register to represent a blank column;
    and means responsive to operation of either of said first or second means to intermittently compare said registers in synchronism with operation of said first register and advance said card one column each time said registers compare.

3. In a card verifier, the combination of:
    intermittently operated transport means for advancing a card one column in response to each operation thereof;
    sensing means adapted to receive data to be compared with the data from the card;
    register means adapted to receive data to be compared with the data read from the card;
    a keyboard for entering data into said register means;
    vertifying means for comparing the data in said register with that read from a card;
    means responsive to said verifying means for operating said transport means when said data compare;
    error detection means responsive to said verifying means when said data are dissimilar;
    selectively operable left zero verification initiation means;
    selectively operable blank column verification initiation means;
    first means responsive to either of said initiation means for causing said register to represent a left zero column or a blank column;
    second and third means responsive to operation of either of said initiation means for operating respectively said verifying means and said transport means to verify successive columns of a card until a column is reached containing data dissimilar to that of said register;
    third means responsive to said initiation means for rendering ineffective said keyboard and said error detection means until said data are found to be dissimilar, whereupon said keyboard and said error detection means are rendered effective.

4. In a card verifier, the combination of:
    first and second registers;
    sensing means for controlling operation of said first register;
    a keyboard for controlling operation of said second register;
    verifying means for comparing said registers;
    escapement means controlled by said verifying means for advancing a card when said registers compare;
    error detection means activated by said verifying means when said registers do not compare;
    said second register including one relay for controlling the setting of second said register to represent zero or a blank column;
    first and second relays controlling operation of said one relay and operative to set said second register to represent zero when only said second relay is operated or to represent a blank column when both said first and second relays are operated;
    means controlled by said second relay for preventing operation of said keyboard and said error detection means during operation of said second relay;
    means responsive to said verifying means for discontinuing operation of said first and second relays when said registers do not compare;
    selectively actuable left zero verification initiation means operative when actuated to operate said second relay;
    selectively actuable blank column verification initiation means operative when actuated to operate first relay;
    said second relay being further controlled by said first relay so as to be operated in response to operation of said first relay;
    and first and second means responsive to operation of said second relay to sequentially and repetitively operate said verifying means and said escapement means to verify left zeros or blank columns, in accordance with which initiation means is activated, until a column is reached creating a lack of comparison between said registers.

5. In a card verifier, the combination of:
    first and second registers each containing a plurality of settable elements including a zero element which, when set, represents zero, said registers each representing a blank column when all elements are unset;
    sensing means adapted to read data from a card and set said first register in accordance therewith;
    a left zero relay including contacts arranged to partly control the setting of said zero element of said second register;
    a blank column relay including contacts arranged to partly control the setting of said zero element of said second register, whereby when only said left zero relay is operated, said zero element is set and when both relays are operated, said zero element controlled thereby is unset;
    holding means adapted to hold operation of said relays and the setting of said zero element;
    verifying means for comparing said registers;
    escapement means adapted to advance a card past said sensing means;
    and control means operated in synchronism with movement of the card to respond to said verifying means and either operate said escapement means when said registers compare or to interrupt said holding means when said registers lack a comparison, so as to verify left zeros or blank columns in accordance with what said second register represents.

6. The combination of claim 5 and including program control means defining length of a field and controlling said holding means so that blank column or left zero verification continues until either the end of the field or a lack of comparison is reached.

7. The combination of claim 6 wherein said program means includes means to initiate left zero verification; and said verifier further includes means independent of said program means for initiating blank column verification.

8. The combination of claim 7 wherein said means for initiating blank column verification further includes means responsive to said program means.

References Cited

UNITED STATES PATENTS

| | | | |
|---|---|---|---|
| 1,751,584 | 3/1930 | Hansell | 178—6.7 |
| 2,615,333 | 10/1952 | Gardinor et al. | 235—61.7 XR |
| 2,841,981 | 7/1958 | Rockefeller et al. | 73—156 |
| 2,921,736 | 1/1960 | Hatherall et al. | 235—61.115 |
| 3,348,411 | 10/1967 | Roe | 73—156 |

LOUIS R. PRINCE, Primary Examiner

JEFFREY NOLTON, Assistant Examiner

U.S. Cl. X.R.

235—61.7